United States Patent
Kita et al.

(10) Patent No.: US 9,458,753 B2
(45) Date of Patent: Oct. 4, 2016

(54) DIESEL ENGINE WITH REDUCED PARTICULATE MATERIAL ACCUMULATION AND RELATED METHOD

(71) Applicant: KUBOTA Corporation, Osaka-shi, Osaka (JP)

(72) Inventors: Kentarou Kita, Sakai (JP); Tamotsu Kuno, Sakai (JP); Katsushi Inoue, Sakai (JP); Yuuji Takemura, Sakai (JP); Yuuki Ishii, Sakai (JP); Yusuke Komemushi, Sakai (JP); Tomoya Hasegawa, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 14/477,968

(22) Filed: Sep. 5, 2014

(65) Prior Publication Data
US 2015/0089925 A1   Apr. 2, 2015

(30) Foreign Application Priority Data
Sep. 30, 2013   (JP) ................... 2013-203012

(51) Int. Cl.
*F02D 43/00* (2006.01)
*F01N 9/00* (2006.01)
(Continued)

(52) U.S. Cl.
CPC ............... *F01N 9/002* (2013.01); *F01N 3/023* (2013.01); *F02D 41/0002* (2013.01); *F02D 41/025* (2013.01); *F02D 41/029* (2013.01); *F02D 41/1446* (2013.01); *F01N 2430/06* (2013.01); *F01N 2430/085* (2013.01); *F01N 2430/10* (2013.01); *F01N 2550/04* (2013.01); *F01N 2900/0408* (2013.01); *F01N 2900/1404* (2013.01); *F01N 2900/1602* (2013.01); *F01N 2900/1606* (2013.01); *F02D 2011/102* (2013.01); *F02D 2200/0802* (2013.01); *F02D2200/0812* (2013.01); *Y02T 10/26* (2013.01); *Y02T 10/42* (2013.01); *Y02T 10/47* (2013.01)

(58) Field of Classification Search
CPC ......... F02D 41/0002–41/0007; F02D 41/402; F02D 41/405; F02D 2011/102; F01N 2430/085
See application file for complete search history.

(56) References Cited

FOREIGN PATENT DOCUMENTS

| | | |
|---|---|---|
| JP | H04308309 A | 10/1992 |
| JP | 2007-321705 A | 12/2007 |

(Continued)

OTHER PUBLICATIONS

Machine translation of JP 2007-321705 A, accessed Dec. 5, 2015.*

(Continued)

*Primary Examiner* — Jonathan Matthias
(74) *Attorney, Agent, or Firm* — Panitch Schwarze Belisario & Nadel LLP (57) ABSTRACT

The present invention provides a diesel engine capable of preventing a PM accumulation amount from increasing excessively. If DOC inlet exhaust gas temperature ("IEGT") does not reach a predetermined value T0, a control unit carries out air intake amount feedback control ("AIAFC"), and a target value of intake throttling is set to a predetermined air intake amount. If the DPF regenerating processing is not started even if elapsed time reaches a predetermined value t after AIAFC is started in a state where the DOC IEGT does not reach the predetermined value T0, the control unit changes AIAFC to exhaust gas temperature feedback control ("EGTFC"). In EGTFC, the control unit changes a target value of intake throttling to a predetermined DOC IEGT T0. If application of a load exceeding a predetermined amount is detected before the DOC IEGT reaches the predetermined value T0, the control unit returns EGTFC to AIAFC.

12 Claims, 4 Drawing Sheets

(51) Int. Cl.
  *F01N 3/023* (2006.01)
  *F02D 41/02* (2006.01)
  *F02D 41/14* (2006.01)
  *F02D 41/00* (2006.01)
  *F02D 11/10* (2006.01)

(56) References Cited

FOREIGN PATENT DOCUMENTS

| JP | 2009174513 A | | 8/2009 |
|---|---|---|---|
| JP | 2010151058 A | | 7/2010 |
| JP | 2012067731 A | * | 4/2012 |

OTHER PUBLICATIONS

Machine translation of JP 2012-067731 A, accessed on Dec. 5, 2015.*

Office Action issued Feb. 2, 2016 in JP Application No. 2013203012.

* cited by examiner

FIG. 1

FIG. 2

DIESEL ENGINE WITH REDUCED PARTICULATE MATERIAL ACCUMULATION AND RELATED METHOD

BACKGROUND OF THE INVENTION (1) Field of the Invention

The present invention relates to a diesel engine, and more particularly, to a diesel engine capable of preventing a PM accumulation amount of a DPF from increasing excessively.

(2) Description of Related Art

As conventional diesel engines, there is a diesel engine including a DOC, a DPF, a PM accumulation amount estimating device of the DPF, a control unit, a DPF regenerating device, a DOC inlet temperature detector, an intake throttle device and an air intake amount detector (see Japanese Patent Application No. 2007-321705 (FIG. 1) for example).

The engine of this kind has a merit that even if the PM is accumulated on the DPF, DPF can be regenerated by the DPF regenerating device and the DPF can be reused.

However, the conventional diesel engine has such a problem that an intake throttling target value for regenerating the DPF to increase exhaust gas temperature to activation temperature of the DOC is only an air intake amount.

BRIEF SUMMARY OF THE INVENTION

Problem

There is concern that a PM accumulation amount of the DPF increases excessively.

According to the conventional diesel engine, since the intake throttling target value for regenerating the DPF is only the air intake amount, an intake throttling amount in air intake amount feedback control is limited, and in an operating state where a load is light and exhaust gas temperature is low, DOC inlet exhaust gas temperature does not rise up to DOC activation temperature, regeneration of the DPF is postponed for long periods, and there is concern that the PM accumulation amount of the DPF increases excessively. In this case, the DPF can not be used and exchange thereof is required in some cases.

It is an object of the present invention to provide a diesel engine capable of preventing a PM accumulation amount from increasing excessively.

Means for Solving the Problem

A matter to define the invention is as follows.

Figure 1:
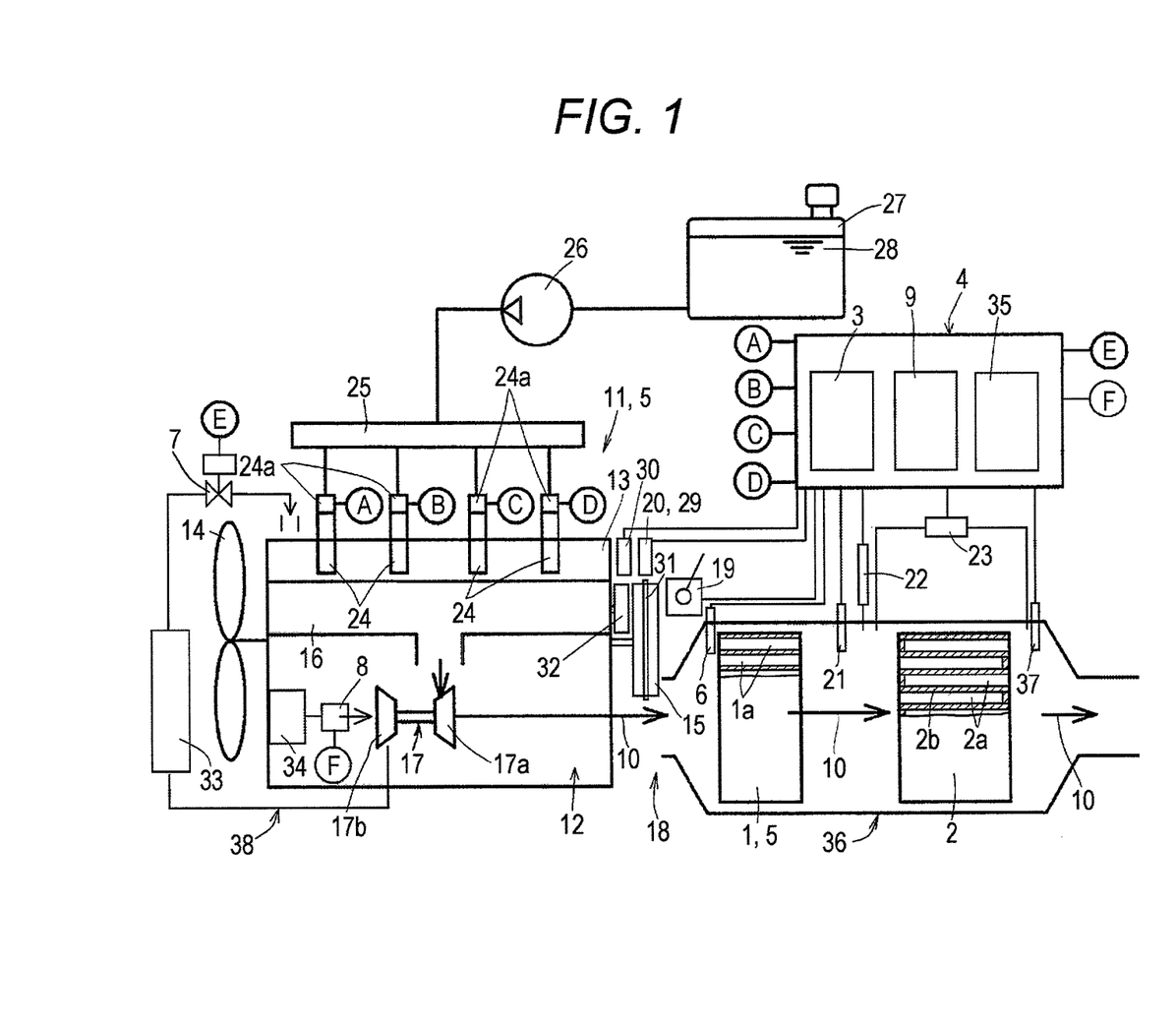
FIG. 1 is a schematic diagram of a diesel engine according to an embodiment of the present invention.
Figure 2:
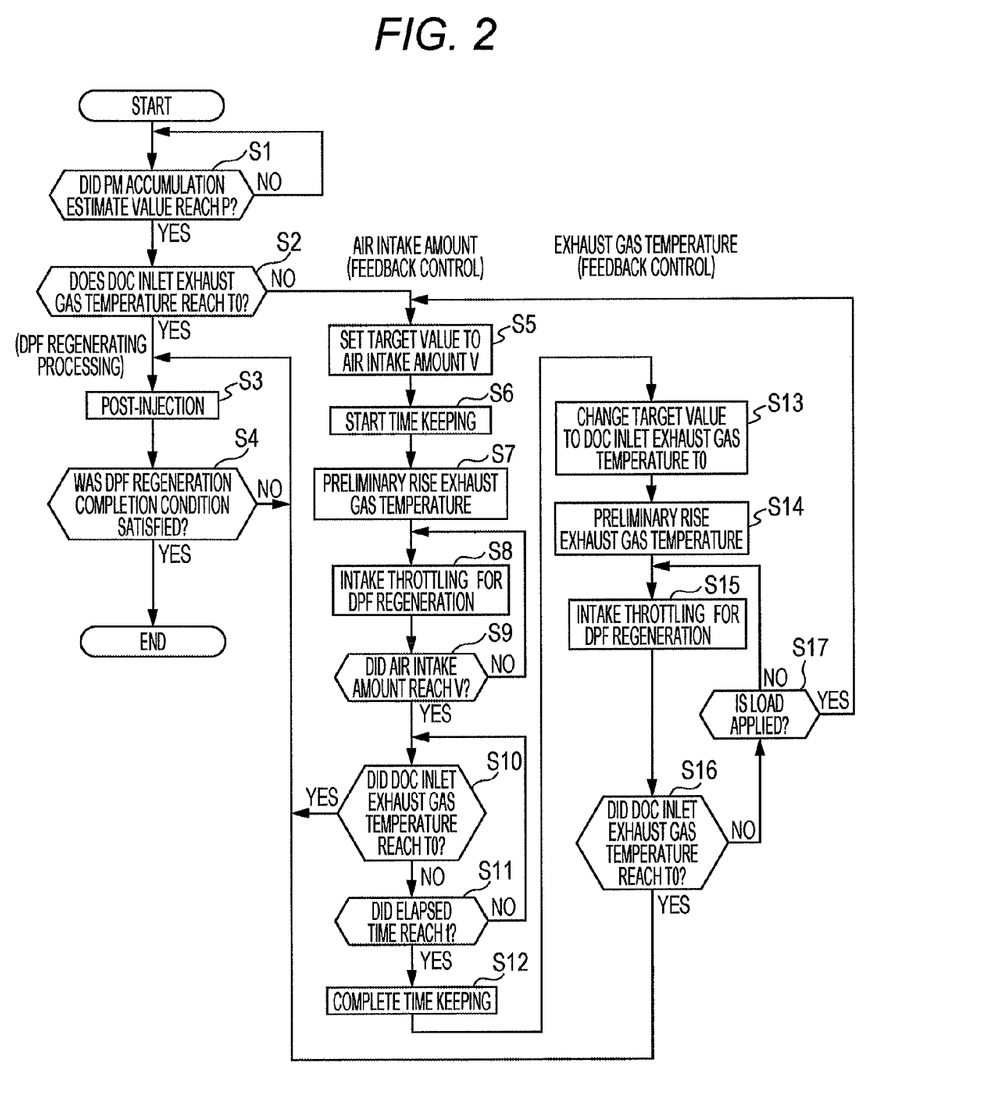
FIG. 2 is a main flowchart of control of the engine shown in FIG. 1.

As illustrated in FIG. 1, a diesel engine includes a DOC 1, a DPF 2, a PM accumulation amount estimating device 3 of the DPF 2, a control unit 4, a DPF regenerating device 5, a DOC inlet exhaust gas temperature detector 6, an intake throttle device 7, an air intake amount detector 8 and a load detector 9, when a PM accumulation estimate value of the DPF 2 reaches a predetermined value P and DOC inlet exhaust gas temperature reaches a predetermined value T0, DPF regenerating processing is started, unburned fuel is mixed into exhaust gas 10 in the DPF regenerating processing by the DPF regenerating device 5 under control of the control unit 4 as illustrated in FIG. 1, temperature of exhaust gas 10 rises by catalytic combustion at the DOC 1 of the unburned fuel, PM accumulated on the DPF 2 is burned and removed and the DPF 2 is regenerated as shown in FIG. 2, when the DOC inlet exhaust gas temperature does not reach the predetermined value T0, air intake amount feedback control is carried out by the control unit 4, in the air intake amount feedback control, a target value of DPF regenerating intake throttling S8 is set S5 to a predetermined air intake amount V, and when the DOC inlet exhaust gas temperature reaches the predetermined value T0 by the DPF regenerating intake throttling S8, the DPF regenerating processing is started, and when the DPF regenerating processing is not started even when elapsed time reaches a predetermined value t after the air intake amount feedback control is started in a state where the DOC inlet exhaust gas temperature does not reach the predetermined value T0, the air intake amount feedback control is changed to exhaust gas temperature feedback control by the control unit 4 as shown in FIG. 2, in the exhaust gas temperature feedback control, a target value of DPF regenerating intake throttling S15 is changed to S13 predetermined DOC inlet exhaust gas temperature T0 by the control unit 4, when the DOC inlet exhaust gas temperature reaches the predetermined value T0 by the DPF regenerating intake throttling S15, the DPF regenerating processing is started, and when application of a load exceeding a predetermined amount is detected before the DOC inlet exhaust gas temperature reaches the predetermined value T0, the exhaust gas temperature feedback control is returned to the air intake amount feedback control by the control unit 4 as shown in FIG. 2.

Effect of the Invention

It is possible to prevent a PM accumulation amount of a DPF from increasing excessively.

As illustrated in FIG. 2, when the DPF regenerating processing is not started even when elapsed time reaches a predetermined value t after the air intake amount feedback control is started in a state where the DOC inlet exhaust gas temperature does not reach the predetermined value T0, the air intake amount feedback control is changed to exhaust gas temperature feedback control by the control unit 4 as illustrated in FIG. 2. Therefore, limitation of the intake throttling of the air intake amount feedback control for regenerating the DPF is released, and air intake is further throttled. According to this, even in the operating state where a load is light and exhaust gas temperature is low, it is possible to raise DOC inlet exhaust gas temperature up to activation temperature of a DOC 1 in a short time, DPF regenerating processing is carried out early, and it is possible to prevent the PM accumulation amount of the DPF from increasing excessively.

Effects

Even if a load is applied, it is possible to stabilize rotation of an engine.

As illustrated in FIG. 2, when application of a load exceeding a predetermined amount is detected before the DOC inlet exhaust gas temperature reaches the predetermined value T0, the exhaust gas temperature feedback control is returned to the air intake amount feedback control by the control unit 4. Therefore, an air intake amount suitable for main injection which is increased by an applied load is secured, and it is possible to stabilize rotation of an engine.

It is possible to stabilize rotation of an engine.

As illustrated in FIG. 2, in the exhaust gas temperature feedback control, before the DPF regenerating intake throttling S15 in which the target value is set to a predetermined DOC inlet exhaust gas temperature T0, exhaust gas preliminary temperature rising processing S14 is carried out by the control unit 4, after-injection S14-3 by the common rail device 11 is included in the exhaust gas preliminary temperature rising processing S14, and the after-injection S14-3 is carried out at injection timing which is earlier than that of the post-injection S3. Therefore, it is possible to preliminary raise temperature of exhaust gas 10 before the DPF regenerating intake throttling S15 by the after-injection S14-3, and it is possible to correspondingly make the intake throttling gentle and to correspondingly increase the air intake amount, and it is possible to stabilize the rotation of the engine by increase in output.

Effects

It is possible to swiftly start the DPF regenerating processing.

As illustrated in FIG. 2, before the DPF regenerating intake throttling S15, after-injection S14-3 preliminary raises temperature of exhaust gas 10, temperature of the DOC 1 is brought close to activation temperature. Therefore, it is possible to swiftly start the DPF regenerating processing.

It is possible to swiftly start the DPF regenerating processing.

As illustrated in FIG. 2, in the air intake amount feedback control, before the DPF regenerating intake throttling S8, the after-injection S7-3 preliminary raises temperature of exhaust gas 10 and temperature of DOC 1 is brought close to activation temperature. Therefore, it is possible to swiftly start the DPF regenerating processing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

FIGS. 1 to 4 are diagrams for describing a diesel engine according to an embodiment of the present invention. In this embodiment, a vertical type straight four-cylinder diesel engine will be described. This engine is used for an engine generator.

A general outline of this engine is as follows.

A cylinder head 13 is assembled into a cylinder block 12, an engine cooling fan 14 is placed on a front portion of the cylinder block 12, and a flywheel 15 is placed on a rear portion of the cylinder block 12.

An intake manifold (not shown) is assembled into one of lateral sides of the cylinder head 13, and an exhaust manifold 16 is assembled into the other lateral side.

A supercharger 17 is mounted on the exhaust manifold 16, an exhaust path 18 extends from an exhaust turbine 17a of the supercharger 17, and an air suction path 38 extends from an air compressor 17b of the supercharger 17.

As shown in FIG. 1, this engine includes a DOC 1, a DPF 2, a PM accumulation amount estimating device 3 of the DPF 2, a control unit 4, a DPF regenerating device 5, a DOC inlet exhaust gas temperature detector 6, an intake throttle device 7, an air intake amount detector 8 and a load detector 9.

As shown in FIG. 1, the DOC 1 is placed on an upstream side in a DPF case 36 of an exhaust path 18, and the DPF 2 is placed on a downstream side in the DPF case 36.

The DOC 1 is an oxidation catalyst, and an oxidation catalyst component of the DOC 1 is supported by a honeycomb-shaped ceramic carrier. The DOC 1 is a flow-through monolith having cells 1a, both ends of the cells 1a are opened, and exhaust gas 10 passes through an inside of the cells 1a.

The DPF 2 is a diesel particulate filter, an oxidation catalyst component of the DPF 2 is supported by a honeycomb-shaped ceramic carrier, the DPF 2 is a wall-flow monolith having adjacent cells 2a and 2a, ends of the cells 2a and 2a are alternately closed, exhaust gas 10 passes through a wall 2b between the adjacent cells 2a and 2a, and PM included in the exhaust gas 10 becomes trapped. The PM is an abbreviation of particulate material.

The PM accumulation amount estimating device 3 of the DPF 2 is a computation unit of an engine ECU which is the control unit 4. The PM accumulation amount estimating device 3 estimates a PM accumulation amount of the DPF 2 from map data which is previously obtained experimentally based on the engine target rotation number, the engine actual rotation number, DPF inlet exhaust gas temperature, DPF inlet exhaust gas pressure, exhaust gas differential pressure at an inlet and an outlet of the DPF 2, DPF outlet exhaust gas temperature and fuel injection amount which are respectively detected by an engine target rotation number setting device 19, an engine actual rotation number detector 20, a DPF inlet exhaust gas temperature detector 21, a DPF inlet exhaust gas pressure detector 22, a differential pressure detector 23 and a DPF outlet exhaust gas temperature detector 37.

The engine ECU is an engine electronic control unit and is a microcomputer.

As shown in FIG. 1, the DPF regenerating device 5 includes the DOC 1 and a common rail device 11.

The common rail device 11 includes injectors 24, a common rail 25, a fuel supply pump 26 and a fuel tank 27. The injector 24 is mounted on the cylinder head 13 for each of the cylinders, and the injectors 24 are connected to the common rail 25 through high pressure pipes. Fuel 28 is supplied, under pressure, from the fuel tank 27 to the common rail 25 by the fuel supply pump 26. A solenoid valve 24a of the injector 24 is electrically connected to the control unit 4, the solenoid valve 24a is opened for predetermined time at predetermined timing, and a predetermined amount of fuel is injected at predetermined timing.

Figure 3:
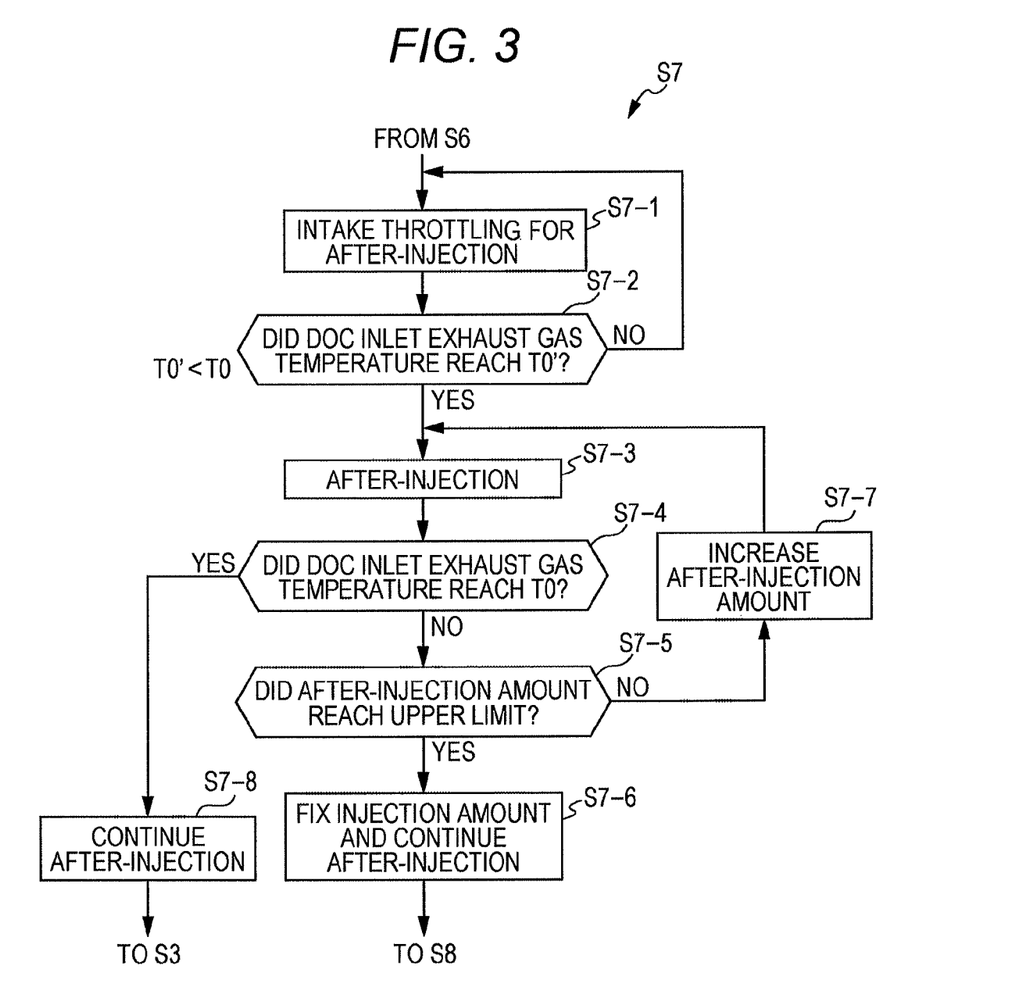
FIG. 3 is a sub-flowchart showing details of after-injection under air intake amount feedback control in FIG. 2.
Figure 4:
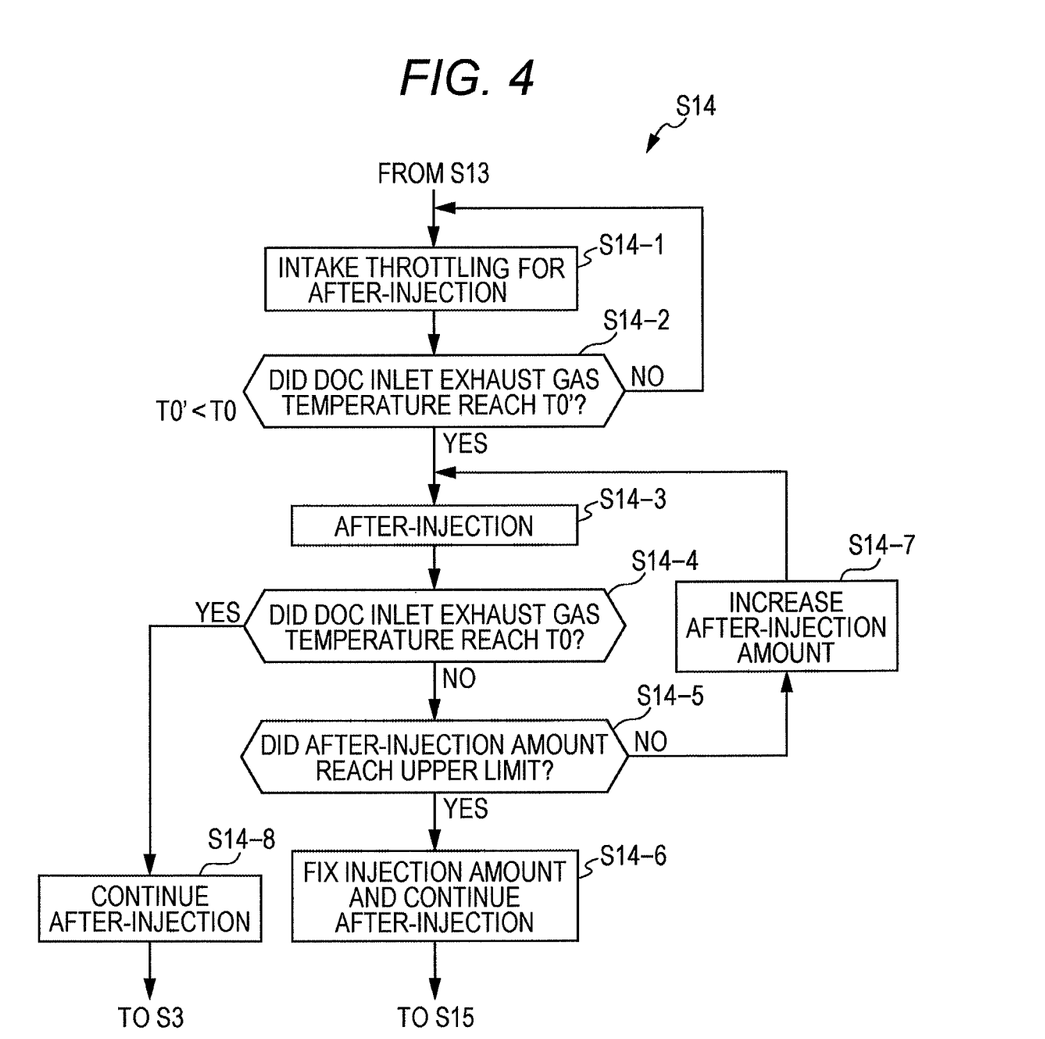
FIG. 4 is a sub-flowchart showing details of after-injection under exhaust gas temperature feedback control in FIG. 2.

As shown in FIGS. 2 to 4, as injections of the common rail device 11, there are main injection which is injected near a top dead center of a compression stroke, after-injections S7-3 and S14-3 and a post-injection S3 which are injected in an exhaust stroke. Injection timing of the after-injections S7-3 and S14-3 is earlier than the post-injection S-3. The main injection is injection for obtaining engine output. The after-injections S7-3 and S14-3 are injections for preliminary raising temperature of exhaust gas 10 before intake throttling S8 and S15 for regenerating the DPF. The post-injection S3 is injection for mixing unburned fuel into exhaust gas 10, for catalytic burning the fuel by the DOC 1, for raising temperature of exhaust gas 10, and for regenerating the DPF 2.

As shown in FIG. 1, injection timing and injection time of the injectors 24 are controlled by the control unit 4 based on the engine actual rotation number and a crank angle respectively detected by the engine actual rotation number detector 20 and a crank angle detector 29, and phases of combustion cycles of the cylinders detected by a cylinder discriminating device 30. The engine actual rotation number detector 20 and the crank angle detector 29 are pickup coils which face an outer periphery of a rotor plate 31 of the flywheel 15. The engine actual rotation number detector 20 and the crank angle detector 29 detect the number of teeth which are provided in quantity on an outer periphery of the rotor plate 31 at constant intervals from one another. The cylinder discriminating device 30 is also a pickup coil which faces an outer periphery of a sensor plate 32 which is mounted on a camshaft. The cylinder discriminating device 30 discriminates phases of combustion cycles of the cylinders by detecting projections provided on the outer periphery of the sensor plate 32. The cylinder discriminating device 30 and the pickup coils configuring the engine actual rotation number detector 20 and the crank angle detector 29 are electrically connected to the control unit 4.

As the DPF regenerating device 5, it is possible to use a combination of the DOC 1 and an exhaust gas pipe fuel injection device in addition to a combination of the DOC 1 and the common rail device 11, and it is also possible to use an electric heater as the DPF regenerating device 5.

As shown in FIGS. 1 and 2, the intake throttle device 7 is an intake throttle valve. When DOC inlet exhaust gas temperature is less than activation temperature T0 of the DOC 1, intake throttling S8 and S15 for gradually reducing an opening degree of the intake throttle valve is carried out by the control unit 4, the air intake amount is reduced, and DOC inlet exhaust gas temperature rises.

The intake throttle device 7 is placed between the intake manifold and an intercooler 33 provided downstream of the air compressor 17b of the supercharger 17.

The air intake amount detector 8 is an air flow sensor, and is placed between an air cleaner 34 and the air compressor 17b of the supercharger 17. The intake throttle device 7 and the air intake amount detector 8 are electrically connected to the control unit 4.

The load detector 9 is a computation processing unit of the engine ECU, and detects a load based on increase in an injection amount of the main injection.

When a mechanical cam-type fuel injection pump is used instead of the common rail device 11, it is possible to use a rack position sensor which detects a fuel amount adjusting rack position of a fuel injection pump as the load detector 9.

As shown in FIG. 2, if the PM accumulation estimate value of the DPF 2 reaches a predetermined value P and the DOC inlet exhaust gas temperature reaches the predetermined value T0, the regenerating processing of the DPF 2 is started. As shown in FIG. 1, in the DPF regenerating processing, unburned fuel is mixed into the exhaust gas 10 by the DPF regenerating device 5 under control of the control unit 4, temperature of the exhaust gas 10 rises by catalytic combustion at the DOC 1 of the unburned fuel, PM accumulated on the DPF 2 is burned and removed, and the DPF 2 is regenerated.

As shown in FIG. 2, when the DOC inlet exhaust gas temperature does not reach the predetermined value T0, the air intake amount feedback control is carried out by the control unit 4. In the air intake amount feedback control, a target value of DPF regenerating intake throttling S8 is set S5 to a predetermined air intake amount V, and if the DOC inlet exhaust gas temperature reaches the predetermined value T0 by the DPF regenerating intake throttling S8, the DPF regenerating processing is started, and even if predetermined time value t is elapsed after the air intake amount feedback control is started in a state where the DOC inlet exhaust gas temperature does not reach the predetermined value T0, if the DPF regenerating processing is not started, the air intake amount feedback control is changed to exhaust gas temperature feedback control by the control unit 4.

As shown in FIG. 2, in the exhaust gas temperature feedback control, a target value of the DPF regenerating intake throttling S15 is changed to predetermined DOC inlet exhaust gas temperature T0 S13 by the control unit 4, and if the DOC inlet exhaust gas temperature reaches the predetermined value T0 by the DPF regenerating intake throttling S15, the DPF regenerating processing is started, and if a load exceeding a predetermined amount is detected before the DOC inlet exhaust gas temperature reaches the predetermined value T0, the exhaust gas temperature feedback control is returned to the air intake amount feedback control by the control unit 4.

As shown in FIGS. 2 and 4, in the exhaust gas temperature feedback control, before the DPF regenerating intake throttling S15 in which the target value is the predetermined DOC inlet exhaust gas temperature T0 is carried out, the exhaust gas preliminary temperature rising processing S14 is carried out by the control unit 4, the after-injection S14-3 by the common rail device 11 is included in the exhaust gas preliminary temperature rising processing S14, and the after-injection S14-3 is carried out at injection timing which is earlier than the post-injection S3.

As shown in FIGS. 2 and 3, in the air intake amount feedback control, before the DPF regenerating intake throttling S8 in which the target value is the predetermined air intake amount V is carried out, exhaust gas preliminary temperature rising processing S7 is carried out by the control unit 4, the after-injection S7-3 by the common rail device 11 is included in the exhaust gas preliminary temperature rising processing S7, and the after-injection S7-3 is carried out at injection timing which is earlier than the post-injection S-3.

A flow of processing carried out by the control unit 4 is as follows.

As shown in FIG. 2, it is determined in step S1 whether an accumulation estimate value of PM which is accumulated on the DPF 2 reaches a predetermined value P. The value P is a determination reference value of DPF regeneration. If the decision in step S1 is NO, determination in step S1 is repeated, and the decision becomes YES, the procedure is shifted to step S2.

It is determined in step S2 whether the DOC inlet exhaust gas temperature reaches the value T0, and if the decision is YES, the procedure is shifted to step S3. The value T0 is activation temperature of the DOC 1.

The post-injection is carried out in step S3, and it is determined in step S4 whether a regeneration completion condition of the DPF 2 is satisfied. The regeneration completion condition is that accumulated time of a DPF inlet exhaust gas temperature more than a predetermined value reaches predetermined time. If the decision in step S4 is YES, the DPF regenerating processing is completed. If the decision in step S4 is NO, the procedure is returned to step S3.

If the decision in step S2 is NO, the air intake amount feedback control of the intake throttling is carried out.

In the air intake amount feedback control, the intake throttling target value is set to the air intake amount V in step S5. The air intake amount V is such an air intake amount that even if a certain level of load is applied to the engine, the engine rotation can stably be maintained, and the intake throttling is more limited as compared with the exhaust gas temperature feedback control in which the exhaust gas temperature is used as a target value.

Time keeping is started in step S6. The time keeping is carried out by a time keeping unit 35 of the control unit 4.

The exhaust gas preliminary temperature rising processing is carried out in step S7. Details of the exhaust gas preliminary temperature rising processing will be described later.

The DPF regenerating intake throttling is carried out in step S8, the intake throttle valve is gradually closed and an opening thereof degree becomes small.

It is determined in step S9 whether the air intake amount reaches the target value V, and if the decision is YES, the procedure is shifted to step S10, and if decision is NO, the procedure is returned to step S8.

It is determined in step S10 whether the DOC inlet exhaust gas temperature reaches the value T0. If the decision is YES, the procedure is shifted to step S3, and if the decision is NO, the procedure is shifted to step S11.

It is determined in step S11 whether the counted elapsed time reaches a predetermined value t. The value t is set to such a time value that postponement of regeneration of the DPF 2 can not further be permitted. If the decision in step S11 is YES, the time keeping is completed in step S12, and control of the intake throttling is switched to the exhaust gas temperature feedback control. If the decision in step S11 is NO, the procedure is returned to step S10.

In the exhaust gas temperature feedback control, the target value of the DPF regenerating intake throttling S15 is changed from the air intake amount V to the DOC inlet exhaust gas temperature T0 in step S13.

The exhaust gas preliminary temperature rising processing is carried out in step S14. Details of the exhaust gas preliminary temperature rising processing will be described later.

The DPF regenerating intake throttling is carried out in step S15, the intake throttle valve is gradually closed and its opening degree becomes small.

It is determined in step S16 whether the DOC inlet exhaust gas temperature reaches the value T0. If the decision is YES, the procedure is shifted to step S3, and if the decision is NO, the procedure is shifted to step S17.

It is determined in step S17 whether application of a load exceeding a predetermined amount is detected. If the decision is YES, the procedure is returned to step S5, and the exhaust gas temperature feedback control of the intake throttling is returned to the air intake amount feedback control.

Details of the exhaust gas preliminary temperature rising processing by the air intake amount feedback control are as follows.

As shown in FIG. 3, in step S7 where the exhaust gas preliminary temperature rising processing is carried out, intake throttling for after-injection is first carried out in step S7-1. The intake throttle target value for the after-injection is DOC exhaust gas inlet temperature T0'. The value T0' is temperature of the exhaust gas 10 at which after-injection is burned, and is lower than the value T0 which is the DOC activation temperature.

It is determined in step S7-2 whether the DOC inlet exhaust gas temperature reaches the target value T0'. If the decision is YES, procedure is shifted to step S7-3, and if the decision is NO, procedure is returned to step S7-1.

The after-injection is carried out in step S7-3.

It is determined in step S7-4 whether the DOC inlet exhaust gas temperature reaches the value T0. If the decision is YES, the procedure is shifted to step S7-8, and if the decision is NO, the procedure is shifted to step S7-5.

In step S7-8, the after-injection is continued even after that, and the procedure is shifted to step S3.

It is determined in step S7-5 whether an amount of after-injection reaches an upper limit. If the decision is YES, the procedure is shifted to step S7-6, and if the decision is NO, the procedure is shifted to step S7-7.

In step S7-6, the injection amount is fixed, the after-injection is continued even after that, and the procedure is shifted to step S8.

In step S7-7, the after-injection amount is increased and the procedure is returned to step S7-3.

The exhaust gas preliminary temperature rising processing in the exhaust gas temperature feedback control is the same as the exhaust gas preliminary temperature rising processing in the air intake amount feedback control, and details thereof are as follows.

As shown in FIG. 4, in step S14 where the exhaust gas preliminary temperature rising processing is carried out, intake throttling for after-injection is first carried out in step S14-1. The intake throttling target value for the after-injection is DOC exhaust gas inlet temperature T0'. The value T0' is temperature of the exhaust gas 10 at which after-injection is burned, and is lower than the value T0 which is the DOC activation temperature.

It is determined in step S14-2 whether the DOC inlet exhaust gas temperature reaches the target value T0'. If the decision is YES, the procedure is shifted to step S14-3, and if the decision is NO, the procedure is returned to step S14-1.

The after-injection is carried out in step S14-3.

It is determined in step S14-4 whether the DOC inlet exhaust gas temperature reaches the value T0. If the decision is YES, the procedure is shifted to step S14-8, and if the decision is NO, the procedure is shifted to step S14-5.

In step S14-8, the after-injection is continued even after that, and procedure is shifted to step S3.

It is determined in step S14-5 whether an amount of after-injection reaches an upper limit. If the decision is YES, procedure is shifted to step S14-6, and if the decision is NO, the procedure is shifted to step S14-7.

In step S14-6, the injection amount is fixed, the after-injection is continued even after that, and the procedure is shifted to step S15.

In step S14-7, the after-injection amount is increased and the procedure is returned to step S14-3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A diesel engine comprising:
a control unit operatively connected to and programmed to control a DOC, a DPF, a PM accumulation amount estimating device of the DPF, a DPF regenerating device, a DOC inlet exhaust gas temperature detector, an intake throttle device, an air intake amount detector and a load detector,
wherein when a PM accumulation estimate value of the DPF reaches a predetermined value (P) and DOC inlet exhaust gas temperature reaches a predetermined value (T0), then a DPF regenerating processing is started, unburned fuel is mixed into exhaust gas in the DPF regenerating processing by the DPF regenerating device under control of the control unit, temperature of exhaust gas rises by catalytic combustion at the DOC of the unburned fuel, PM accumulated on the DPF is burned and removed and the DPF is regenerated,
wherein if the PM accumulation estimate value of the DPF reaches a predetermined value (P) and the DOC inlet exhaust gas temperature does not reach the predetermined value (T0), then air intake amount feedback control is carried out by the control unit, in the air intake amount feedback control, a target value of DPF regenerating intake throttling is set to a predetermined air intake amount (V), and
when the DOC inlet exhaust gas temperature reaches the predetermined value (T0) by the DPF regenerating intake throttling, the DPF regenerating processing is started, and
when the DPF regenerating processing is not started even when elapsed time reaches a predetermined value (t) after the air intake amount feedback control is started in a state where the DOC inlet exhaust gas temperature does not reach the predetermined value (T0), then the air intake amount feedback control is changed to exhaust gas temperature feedback control by the control unit, in the exhaust gas temperature feedback control, a target value of DPF regenerating intake throttling is changed to the predetermined DOC inlet exhaust gas temperature (T0) by the control unit, and
when the DOC inlet exhaust gas temperature reaches the predetermined value (T0) by the DPF regenerating intake throttling, the DPF regenerating processing is started, and when application of a load exceeding a predetermined amount is detected before the DOC inlet exhaust gas temperature reaches the predetermined value (T0), the exhaust gas temperature feedback control is returned to the air intake amount feedback control by the control unit.

2. The diesel engine according to claim 1, wherein the DOC and a common rail device are used for the DPF regenerating device, the DPF regenerating processing is carried out in a post-injection, in the exhaust gas temperature feedback control, before the DPF regenerating intake throttling in which the target value is set to a predetermined DOC inlet exhaust gas temperature (T0), exhaust gas preliminary temperature rising processing is carried out by the control unit, after-injection by the common rail device is included in the exhaust gas preliminary temperature rising processing, and the after-injection is carried out at injection timing which is earlier than that of the post-injection.

3. The diesel engine according to claim 2, wherein, in the air intake amount feedback control, before the DPF regenerating intake throttling in which a target value is a predetermined air intake amount (V), exhaust gas preliminary temperature rising processing is carried out by the control unit, after-injection by the common rail device is included in the exhaust gas preliminary temperature rising processing, and the after-injection is carried out at injection timing which is earlier than that of the post-injection.

4. The diesel engine according to claim 1, wherein the DOC and a common rail device are used for the DPF regenerating device, the DPF regenerating processing is carried out in the post-injection, in the air intake amount feedback control, before the DPF regenerating intake throttling in which a target value is a predetermined air intake amount (V), exhaust gas preliminary temperature rising processing is carried out by the control unit, after-injection by the common rail device is included in the exhaust gas preliminary temperature rising processing, and the after-injection is carried out at injection timing which is earlier than that of the post-injection.

5. A method of preventing excessive increase of a PM accumulation amount in a diesel engine having a DOC, a DPF, a PM accumulation amount estimating device of the DPF, a control unit, a DPF regenerating device, a DOC inlet exhaust gas temperature detector, an intake throttle device, an air intake amount detector and a load detector, the method comprising:
determining a PM accumulation estimate value of the DPF;
determining DOC inlet exhaust gas temperature; and
if the PM accumulation estimate value of the DPF reaches a predetermined value (P) and the DOC inlet exhaust gas temperature reaches a predetermined value (T0), then:
initiating DPF regenerating processing, including mixing unburned fuel into exhaust gas in the DPF regenerating processing by the DPF regenerating device under control of the control unit, and, in turn, raising temperature of exhaust gas by catalytic combustion at the DOC of the unburned fuel, and burning and removing PM accumulated on the DPF, and, in turn, regenerating the DPF,
if the PM accumulation estimate value of the DPF reaches a predetermined value and the DOC inlet exhaust gas temperature does not reach the predetermined value (T0), then:
executing air intake amount feedback control via the control unit, including setting a target value of DPF regenerating intake throttling to a predetermined air intake amount (V) in the air intake amount feedback control, initiating the DPF regenerating intake throttling, and
if the DOC inlet exhaust gas temperature reaches the predetermined value (T0), then:
initiating the DPF regenerating processing;
if the DPF regenerating processing is not started and time elapsed after air intake amount feedback control initiation reaches a predetermined value (t), then:
changing the air intake amount feedback control to exhaust gas temperature feedback control via control unit;
changing a target value of DPF regenerating intake throttling to the predetermined DOC inlet exhaust gas temperature (T0) via the control unit,
initiating the DPF regenerating intake throttling, and
if the DOC inlet exhaust gas temperature reaches the predetermined value (T0), then:
initiating the DPF regenerating processing, and
if application of a load exceeding a predetermined amount is detected before the DOC inlet exhaust gas temperature reaches the predetermined value (T0), then:

returning the exhaust gas temperature feedback control to the air intake amount feedback control via the control unit.

6. The method according to claim 5, wherein the diesel engine further comprises a common rail device, the DOC and a common rail device being used for the DPF regenerating device, and wherein the steps of initiating DPF regenerating processing comprise initiating DPF regenerating processing in a post-injection.

7. The method according to claim 6, further comprising the step of initiating exhaust gas preliminary temperature rising processing via the control unit, subsequent to the steps of changing the air intake amount feedback control to exhaust gas temperature feedback control and changing a target value of DPF regenerating intake throttling to the predetermined DOC inlet exhaust gas temperature (T0), and prior to the step of initiating the DPF regenerating intake throttling.

8. The method according to claim 7, wherein the step of initiating exhaust gas preliminary temperature rising processing comprises injecting an after-injection via the common rail device, and the after-injection is carried out at an injection timing prior to that of the post-injection.

9. The method according to claim 7, further comprising the step of initiating exhaust gas preliminary temperature rising processing via the control unit, subsequent to the steps of executing air intake amount feedback control and setting a target value of DPF regenerating intake throttling to a predetermined air intake amount (V), and prior to the step of initiating the DPF regenerating intake throttling.

10. The method according to claim 9, wherein the step of initiating exhaust gas preliminary temperature rising processing comprises injecting an after-injection via the common rail device, and the after-injection is carried out at an injection timing prior to that of the post-injection.

11. The method according to claim 6, further comprising the step of initiating exhaust gas preliminary temperature rising processing via the control unit, subsequent to the steps of executing air intake amount feedback control and setting a target value of DPF regenerating intake throttling to a predetermined air intake amount (V), and prior to the step of initiating the DPF regenerating intake throttling.

12. The method according to claim 11, wherein the step of initiating exhaust gas preliminary temperature rising processing comprises injecting an after-injection via the common rail device, and the after-injection is carried out at an injection timing prior to that of the post-injection.

* * * * *